United States Patent
Smeets et al.

(10) Patent No.: US 9,820,421 B2
(45) Date of Patent: Nov. 21, 2017

(54) CROP-PRODUCTION TOOL

(71) Applicant: Betek GmbH & Co. KG, Aichhalden (DE)

(72) Inventors: Florian Smeets, Baiersbronn (DE); Heiko Friederichs, Aichhalden (DE)

(73) Assignee: BETEK GmbH & Co. KG (DE)

( * ) Notice: Subject to any disclaimer, the term of this patent is extended or adjusted under 35 U.S.C. 154(b) by 0 days.

(21) Appl. No.: 14/419,467

(22) PCT Filed: Jul. 12, 2013

(86) PCT No.: PCT/EP2013/064803
§ 371 (c)(1),
(2) Date: Mar. 24, 2015

(87) PCT Pub. No.: WO2014/026815
PCT Pub. Date: Feb. 20, 2014

(65) Prior Publication Data
US 2015/0230386 A1    Aug. 20, 2015

(30) Foreign Application Priority Data
Aug. 15, 2012 (DE) .................. 10 2012 107 476

(51) Int. Cl.
*A01B 39/22* (2006.01)
*A01B 76/00* (2006.01)

(52) U.S. Cl.
CPC .............. *A01B 39/22* (2013.01); *A01B 76/00* (2013.01)

(58) Field of Classification Search
CPC .................................. A01B 39/22; A01B 76/00
USPC ......... 172/700, 753, 762, 769; 403/208, 354
See application file for complete search history.

(56) References Cited

U.S. PATENT DOCUMENTS

| | | | | |
|---|---|---|---|---|
| 7,822 A | * | 12/1850 | Pennock | E21B 17/046 172/753 |
| 756,849 A | * | 4/1904 | Gwynes | A01B 15/025 172/700 |
| 833,789 A | * | 10/1906 | Machia | A01B 15/04 172/754 |
| 1,220,071 A | * | 3/1917 | Clayton | A01B 39/26 172/165 |

(Continued)

FOREIGN PATENT DOCUMENTS

| AU | 2011200055 A1 | 7/2011 |
|---|---|---|
| CA | 2377475 A1 | 9/2003 |
| WO | 2014026815 A1 | 2/2014 |

OTHER PUBLICATIONS

English translation of International Search Report in corresponding International Application No. PCT/EP2013/064803, dated Oct. 16, 2013, 3 pages (not prior art).

(Continued)

*Primary Examiner* — Gary S Hartmann
(74) *Attorney, Agent, or Firm* — Lucian Wayne Beavers; Patterson Intellectual Property Law, PC

(57) ABSTRACT

An earth working tool (20), in particular a cultivator bar for agriculture, has a mounting segment (21) and a working part (22) directly or indirectly adjoining it. A wear-optimized design for the earth working tool (20) is achieved according to the present invention by the fact the mounting segment (21) comprises two support surfaces (21.6, 21.8), spaced apart from one another, that are part of a hook-in connection.

13 Claims, 4 Drawing Sheets

(56) References Cited

U.S. PATENT DOCUMENTS

| | | | | |
|---|---|---|---|---|
| 1,332,833 A * | 3/1920 | Hasting | A01B 39/18 | |
| | | | 172/769 | |
| 1,514,782 A | 11/1924 | Nobles et al. | | |
| 1,524,227 A * | 1/1925 | Ault | A01B 15/00 | |
| | | | 172/769 | |
| 2,521,045 A * | 9/1950 | Corbell | E02F 9/2875 | |
| | | | 172/762 | |
| 2,595,352 A * | 5/1952 | Graham | A01B 35/24 | |
| | | | 172/681 | |
| 2,757,595 A * | 8/1956 | Clifford | A01B 35/225 | |
| | | | 172/762 | |
| 2,781,733 A * | 2/1957 | Graham | A01C 23/025 | |
| | | | 111/123 | |
| 2,904,119 A | 9/1959 | Hunter | | |
| 3,259,087 A | 7/1966 | Horton | | |
| 3,704,753 A * | 12/1972 | Hasforth | E02F 9/2841 | |
| | | | 172/700 | |
| 3,999,614 A * | 12/1976 | Rhoads | E02F 9/2875 | |
| | | | 172/719 | |
| 4,047,823 A * | 9/1977 | Mydels | A01B 23/02 | |
| | | | 172/708 | |
| 4,190,115 A | 2/1980 | Couture | | |
| 6,363,871 B1 * | 4/2002 | Puetz | A01C 7/201 | |
| | | | 111/152 | |
| 6,684,963 B1 * | 2/2004 | Poutre | A01B 35/225 | |
| | | | 172/750 | |
| 7,891,436 B2 * | 2/2011 | Cruson | A01C 5/062 | |
| | | | 111/156 | |
| 2004/0083867 A1 | 5/2004 | Elock et al. | | |

OTHER PUBLICATIONS

English translation of the PCT Written Opinion of the International Searching Authority in corresponding International Application No. PCT/EP2013/064803, dated Oct. 16, 2013, 7 pages (not prior art).

\* cited by examiner

CROP-PRODUCTION TOOL

BACKGROUND OF THE INVENTION

1. Field of the Invention

The invention relates to an earth working tool, in particular to a cultivator bar for agriculture, having a mounting segment and having a working part directly or indirectly adjoining it.

2. Description of the Prior Art

Cultivator bars having an integrated working part are used in agriculture for seeding preparation and in order to loosen the soil. They comprise a working part that is equipped with a cutting edge at the end. Adjoining the working part is an arc-shaped arm that can be mounted on a tool carrier. During working utilization, the working part engages deeply into the soil. In order to allow reliable dissipation of the large bending torques occurring in this context, the arc-shaped arm is of relatively solid configuration. The working part is exposed to the abrasive attack of soil, so that the earth working tool must be replaced when the end of its service life is reached.

SUMMARY OF THE INVENTION

The object of the invention is to create an earth working tool of the kind mentioned above which is embodied in a wear-optimized and utilization-optimized manner.

This object is achieved in that the mounting segment of the earth working tool comprises two support surfaces, spaced apart from one another, that are part of a support connection, in particular of a hook-in connection.

A tool separation is therefore effected according to the present invention, the working part exposed to severe wear attack being embodied separately from the actual machine mounting part (for example, the arc-shaped mounting arm). Stable coupling is achieved in simple fashion via the mounting segment that is embodied with the support connection or hook-in connection. During working utilization, the earth working tool according to the present invention can thus easily be hitched onto the machine mounting part and fastened thereon. The forces occurring during operational use can be reliably dissipated via the spaced-apart support surfaces. Large torques can reliably be absorbed by means of the support spacing. When the working tool is worn out, it can easily be replaced again and lifted out of the support connection, in particular the hook-in connection. The actual machine mounting part can remain installed on the machine and can be reused. The result is to create a wear system that is designed in wear-optimized fashion and, thanks to the quick-change system, in utilization-optimized fashion.

A preferred embodiment of the invention is such that at least one of the support surfaces is embodied in at least locally curved, in particular, convex, fashion. The curved geometry allows creation of a defined abutment against the carrier on which the working part is installed. For example, an approximately linear support point can be effected, which enables a reproducible clamping connection. Preferably a convex geometry is used. It is also conceivable, however, to use a concave geometry, in particular a hollow on the working part. For purposes of kinematic reversal, a curved geometry (convex or concave) can also be provided on the carrying part.

It is furthermore also possible for both the carrying part and the working part to form, on their support surfaces, curved geometries (convex or concave) that then abut against one another in operational use.

According to a conceivable inventive variant, provision can be made that the support surfaces are arranged spaced apart from one another transversely to the tool advance direction, thus achieving a load-optimized configuration of the hook-in connection.

Particularly preferably the support surfaces are arranged with respect to one another at an angle, preferably in the range between $>0°$ and $\leq 90°$. Zero-clearance clamping of the earth working tool can thereby be achieved. Jamming of the hook-in connection is prevented with this inclination angle, so that the hook-in connection can always reliably be released even when dirt has penetrated into the hook-in connection.

According to a conceivable inventive alternative, provision can be made that the mounting segment comprises a coupling part having a hook-like projection. On the one hand, with the hook-like projection hooking-in can easily be performed even with rough working use. On the other hand, load forces can be transferred in positively fitting fashion via the hook-like projection. The hook-like projection preferably comprises the first support surface, so that a compact design is achieved.

If provision is additionally made that the hook-like projection forms an extension that is wedge-shaped in cross-section, zero-clearance clamping of the coupling part to the machine mounting part can then be achieved.

An earth working tool according to the present invention can be such that the mounting segment comprises a spacer that holds the parts which carry the support surfaces spaced apart from one another. The spacer absorbs the flexural stress between the two support surfaces and can be correspondingly configured in terms of its cross section in order to exhibit a high equatorial resistance torque against flexion. The spacer preferably has a greater overall height in the advance direction than transversely to the advance direction. In addition, the flexural stress on the spacer can also be adjusted by way of the spacing dimension between the two support surfaces.

The coupling part of the earth working tool can comprise a hook-in receptacle that in particular can also be arranged adjacently to the hook-like projection in order to form an interlock segment. The use of a hook-in receptacle guarantees a positively fitting connection. The interlocking association of the earth working tool with the machine carrying part creates a positively fitting connection.

In the context of an earth working tool according to the present invention, provision can further be made that the coupling part comprises a lateral surface, facing oppositely to the tool advance direction, which is at an angle, preferably an obtuse angle, to the second support surface. The lateral surface can likewise be used for bracing with respect to the machine mounting part, so that a reduction in load per unit area on the two support surfaces is achieved. The use of an obtuse angle between the lateral surface and the second support surface prevents jamming, and always guarantees easy releasability of the hook-in connection.

A securing receptacle can be provided in order to hold the earth working tool in lossproof fashion on the machine mounting part. For example, a bolt, a clamping ring, or the like can be passed through the securing receptacle.

The object of the invention is also achieved with a carrier for receiving an earth working tool. The carrier serves as a machine mounting part and replaceably receives the earth working tool. In the context of such a tool, provision can be made that it comprises a fastening segment that is adjoined, via a transition segment, by a carrying part that comprises a receptacle for embodying the hook-in connection. A simple and stable embodiment of the receptacle is achieved here by the fact that it is recessed into the carrying part. The earth working tool can then easily be installed into the carrier when the receptacle is opened in the advance direction.

In a carrier according to the present invention, the receptacle is preferably delimited toward the front, in the advance direction, by an extension. The extension receives in positively fitting fashion at least a portion of the working forces that are introduced via the earth working tool. The receptacle can be delimited laterally by two lateral parts extending in the advance direction. These lateral parts prevent transverse shifting of the earth working tool.

BRIEF DESCRIPTION OF THE DRAWINGS

The invention will be explained below in further detail with reference to an exemplifying embodiment depicted in the drawings, in which.

DETAILED DESCRIPTION

Figure 1:
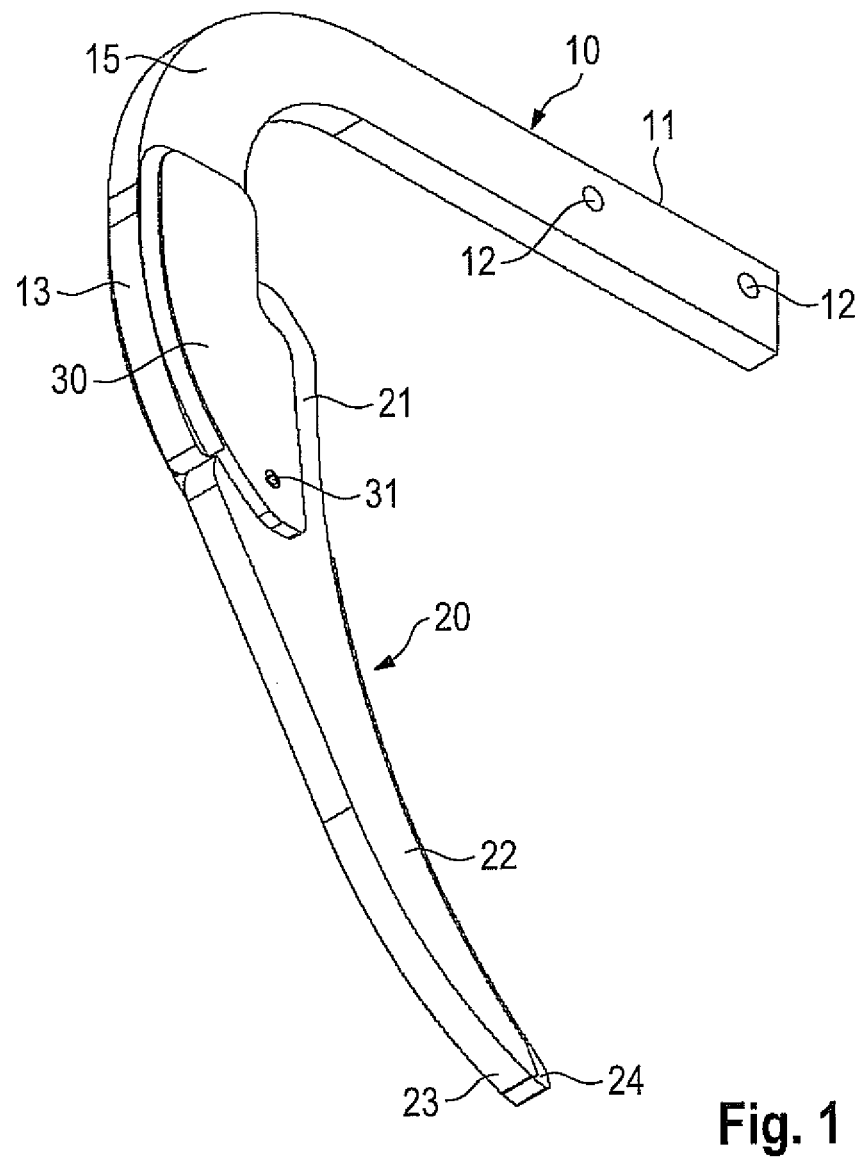
FIG. 1 is a perspective side view of a cultivator bar.
Figure 2:
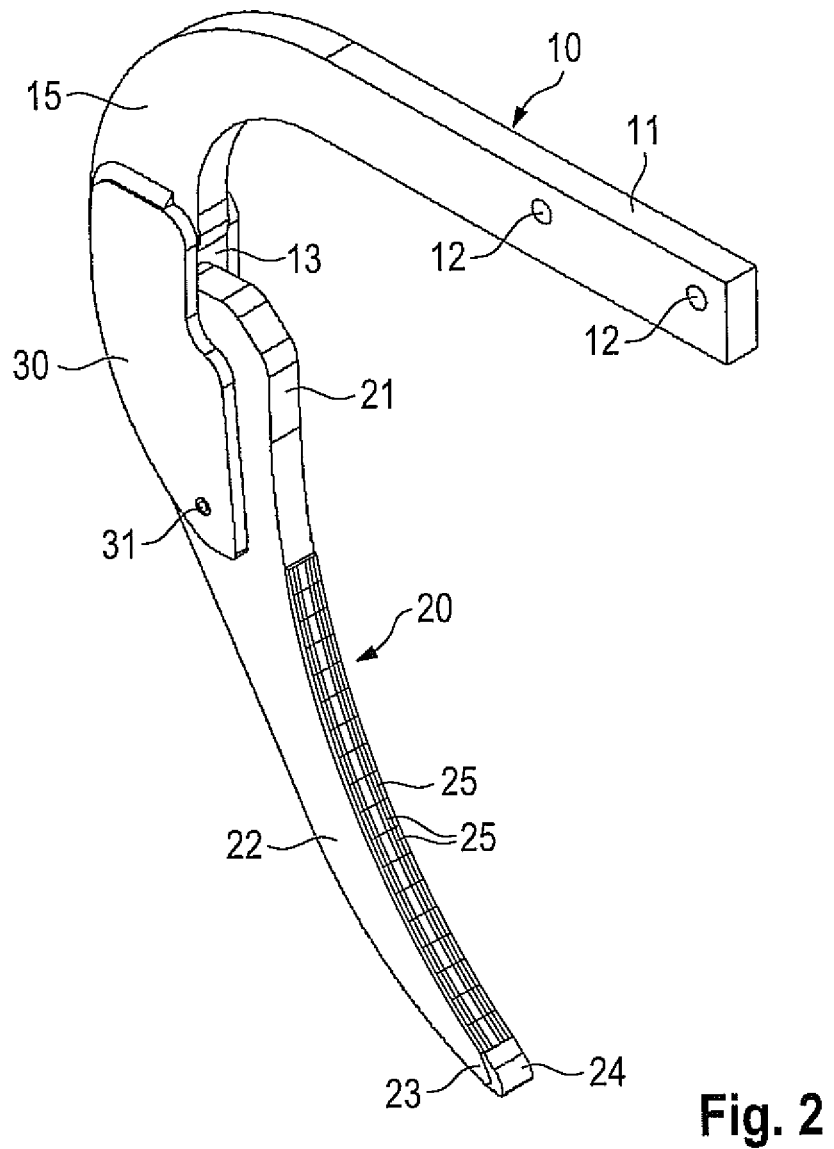
FIG. 2 is a perspective frontal view of the cultivator bar according to FIG. 1.
Figure 3:
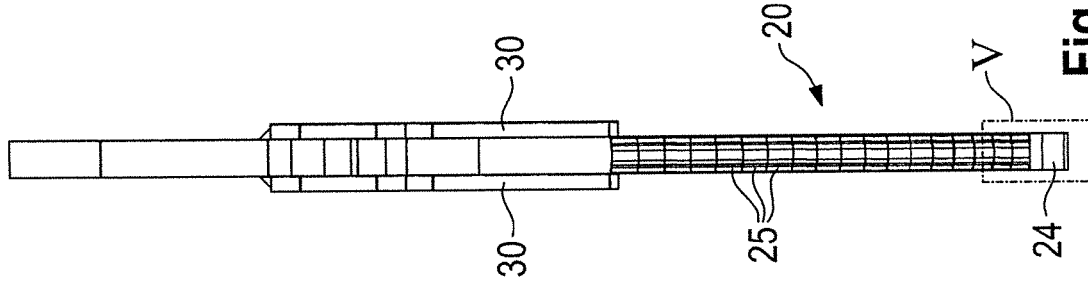
FIG. 3 is a frontal view of the cultivator bar according to FIGS. 1 and 2.

FIG. 1 shows a cultivator bar that comprises a carrier 10 and an earth working tool 20 replaceably connectable thereto. The conformation of carrier 10 can be gathered in greater detail from FIG. 4. As this depiction shows, carrier 10 comprises a fastening segment 11 that is provided with two mounting receptacles 12 embodied as holes. Instead of holes, other mounting receptacles 12 can also be used. Fastening segment 11 serves for coupling the cultivator bar to a usual tool carrier. Adjoining fastening segment 11 via an arc-shaped carrying part 15 is a coupling segment 13. Coupling segment 13 is at a right angle to fastening segment 11. Another suitable angle relationship is likewise conceivable. Coupling segment 13 comprises an end-mounted carrier part 14. Recessed into this on the front side is a receptacle 14.6. Receptacle 14.6 comprises an opening that is accessible oppositely to advance direction V (see FIG. 4). As is evident from FIG. 4, receptacle 14.6 extends over the entire width of coupling segment 13. Carrier 10 can consequently be manufactured in simple fashion as a flame-cut part or forged part. It is also conceivable for receptacle 14.6 to extend over only a portion of the width. Simple production as a forged part is then still possible, and the closed side of receptacle 14.6 offers, without additional parts outlay, a defined abutment for the earth working tool. Receptacle 14.6 is delimited laterally by two lateral parts 30 (see also FIG. 3) that are embodied in the form of panel-shaped segments and are welded laterally onto coupling segment 13. Provided below the opening of receptacle 14.6 is an extension 14.3 that projects in tooth-like fashion. It is also conceivable not to use a recessed receptacle 14.6. In this case the hook-like extension 14.3 can be arranged projectingly on carrying part 15. Adjoining extension 14.3 in the form of a tooth space is a depression that is delimited by a bottom 14.4. Bottom 14.4 transitions into an abutment segment 14.5 that extends transversely to advance direction V. As further shown in FIG. 4, extension 14.3 forms a support surface 14.7 in the transition region to bottom 14.4. Adjoining extension 14.3 on the front side is a surface 14.2. This extends transversely to advance direction V. Surface 14.2 transitions into a further support surface 14.1 that is at an obtuse angle to surface 14.2.

As FIGS. 1 to 4 show, an earth working tool 20 can be replaceably connected to carrier 10. It is evident from FIG. 4 that earth working tool 20 comprises a mounting segment 21 onto which a working part 22 is integrally shaped. Working part 22 is closed off, oppositely to advance direction V, with a back side 22.1 that, with an arc-shaped configuration in the region of the free end of earth working tool 20, forms a fillet transition 22.2. Embodied oppositely to back side 22.1 is a receiving region 22.3 that is of concave configuration.

Figure 4:
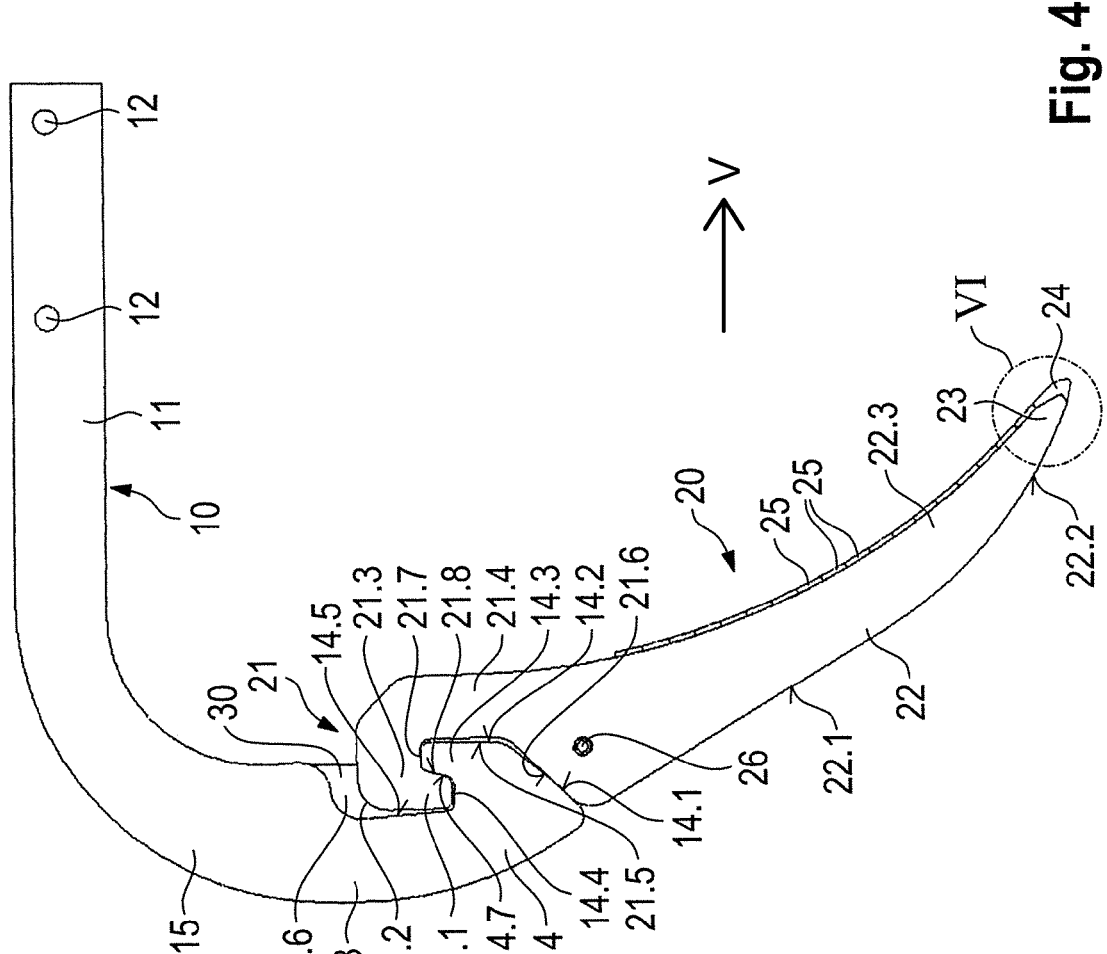
FIG. 4 is a fully sectioned side view of the cultivator bar.
Figure 6:
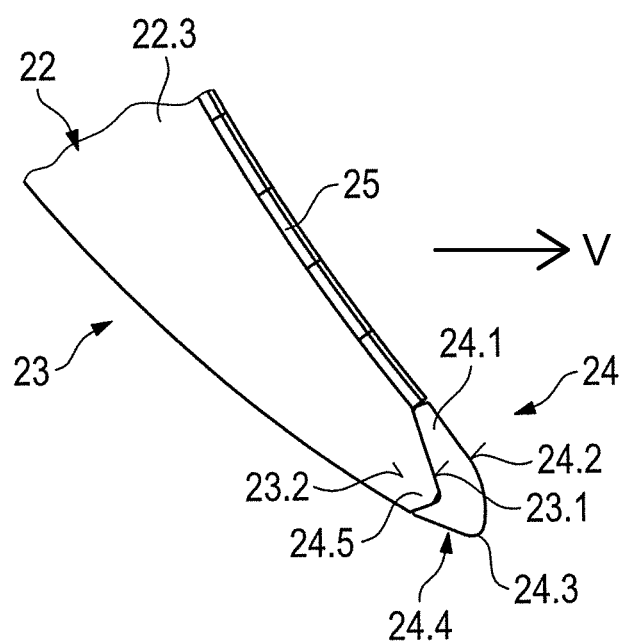
FIG. 6 is an enlarged depiction of a detail taken from FIG. 4 and labeled "VI" therein.

FIG. 6 is an enlarged depiction of the detail labeled "VI" in FIG. 4. As is apparent from this view, working tool 22 terminates in an end piece 23. End piece 23 possesses a contact surface 23.1 that is set an angle<90° with respect to advance direction V. Contact surface 23.1 transitions into a fillet region 23.2 that in turn tapers into fillet transition 22.2.

A cutting element 24 can be fastened, in particular soldered, onto end piece 23. Cutting element 24 is made of a hard material, in particular of carbide.

As FIG. 6 shows, cutting element 24 comprises a connecting part 24.1 that is placed with its planar surface onto contact surface 23.1 and mounted thereon, for example soldered in place. The cutting edge is embodied on its free surface with a discharge surface 24.2 that is embodied convexly for the purpose of better discharge of cut material. In addition, with the convex shape more hard material is positioned in the region of the free end of working part 22, so that more wear volume is available here. Discharge surface 24.2 transitions into a cutting edge 24.3 that is likewise embodied convexly with a fillet radius in order to achieve a sharp-edged cutting engagement. Cutting edge 24.3 adjoins a release surface 24.4 that in turn transitions flush via a connector piece 24.5 into back side, of working part 22. The flush transition represents a wear-optimized tool design and prevents abrasive attack on working part 22. Connector part 24.5 is braced against an end-mounted contact surface 23.2 of end piece 23 and is mounted, in particular soldered, thereonto.

Instead of the angular cutting element 24 depicted in FIG. 6 it is also possible to install a non-angular, in particular plate-shaped cutting element, this cutting element then forming the cutting edge with its plate edge.

As is further evident from FIG. 6, working part 22 is fitted with guide elements 25 in the region of its front-side receiving region 22.3. Guide elements 25 are likewise made of hard material and on the one hand serve for improved wear protection of working part 22. On the other hand they decrease the penetration resistance of the cultivator bar in the interest of a lower machine performance requirement, since they ensure optimized material dissipation.

Figure 5:
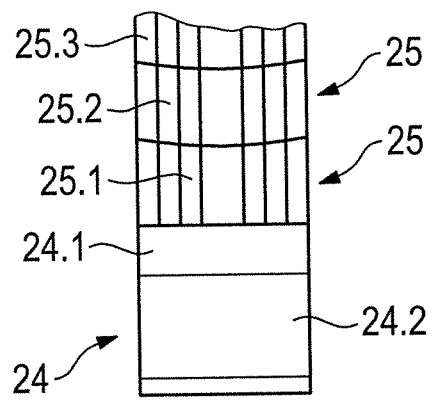
FIG. 5 is an enlarged depiction of a detail taken from FIG. 3 and labeled "V" therein.

FIG. 5 is an enlarged detail showing the configuration and arrangement of guide elements 25. As is apparent from this depiction, guide elements 25 are U-shaped in cross section. They comprise a channel 25.1 onto which lateral parts 25.3 are shaped via transition segments 25.2. Lateral parts 25.3 are spaced apart from one another and enclose channel 25.1 between them. Channel 25.1 transitions flush into discharge surface 24.2 of cutting element 24, so that no disruptive and wear-promoting discontinuities are formed. It is evident from FIG. 3 that a plurality of guide elements 25 are mounted in flush juxtaposition on the front side of working part 22. This segmentation appreciably decreases the risk of breakage of the individual guide elements 25 as compared with a guide element of integral or large-part configuration, and additional machining of the carbide seat is avoided.

As FIG. 4 shows, earth working tool 20 comprises a mounting segment 21. Mounting segment 21 encompasses a projection 21.1 that is of hook-like configuration and forms part of a hook-in connection. Hook-like projection 21.1 terminates, oppositely to advance direction V, in a shaped surface that extends transversely to advance direction V and transitions via a fillet 21.2 into an upper cover segment extending in advance direction V. Adjoining the cover segment on the front side is a chamfer that transitions into a front-side shaped surface.

As is further evident from FIG. 4, hook-like projection 21.1 is shaped integrally onto a coupling part 21.3. Coupling 21.3 constitutes, immediately adjacently to hook-like projection 21.1, a hook-in receptacle 21.7 in the form of a tooth space. Hook-like projection 21.1 delimits hook-in receptacle 21.7 with a support surface 21.8. Support surface 21.8 is arranged obliquely with respect to advance direction V, in particular at an obtuse angle to advance direction V. Oppositely to hook-like projection 21.1, hook-in receptacle 21.7 is delimited by a lateral surface 21.5. Lateral surface 21.5 is part of a spacer 21.4. It is evident from FIG. 4 that working part 22 of the earth working tool comprises a further support surface 21.6. The latter is at an angle to lateral surface 21.5 and to support surface 21.8. The angular relationship here is selected in accordance with the angular relationship between support surfaces 14.1 and 14.2. Support surface 14.1 is equipped with a slight convex curvature.

In order to mount earth working tool 20 on carrier 10, earth working tool 20 is inserted with its hook-like projection 21.1 through the front-side opening into receptacle 14.6. Earth working tool 20 is in this context slightly tilted with respect to carrier 10. Earth working tool 20 is then pivoted into receptacle 14.6 with a vertical lowering motion simultaneously overlaid on a tilting motion oriented oppositely to advance direction V. This installation motion is limited by the tooth-like connection between hook-shaped projection 21.1 and hook-in receptacle 21.7 on the one hand, and extension 14.3 of carrier 10 and the recess arranged adjacently to extension 14.3 on the other hand.

FIG. 4 shows the installed state. A securing receptacle 26 is introduced into working part 22 in order to secure the hooked-in connection between earth working tool 20 and carrier 10. Securing receptacle 26 is embodied as a hole. Securing receptacle 26 aligns with a securing receptacle in lateral parts 30. A securing element, for example a clamping sleeve, can thus be passed through the aligned securing receptacles, for example holes, and earth working tool 20 can thus be securely immobilized on carrier 10. Further support surface 21.6 is braced with its convex curvature against support surface 14.1, and support surface 21.8 is braced against support surface 14.7.

During working utilization, the cultivator bar is moved in advance direction V. A resistance force oriented oppositely to advance direction V is thereby introduced into working part 22 via the soil that acts on the cultivator bar. This reaction force is dissipated by earth working tool 20, by means of support surfaces 21.6 and 21.8, into the associated support surfaces 14.1 and 14.7. During operational use, cutting element 24 cuts into the ground. The soil that has been cut flows off via guide elements 25. Guide elements 25 and cutting element 24 protect working part 22, embodied as a steel element, from abrasive wear. Once the wear limit of guide elements 25 or of cutting element 24 has been reached, earth working tool 20 must be replaced. Carrier 10 can usually remain on the machine, since it is exposed to little or no wear. All that is necessary in order to replace earth working tool 22 is to drive the securing element out of securing receptacle 26. Earth working tool 20 can then be lifted and simultaneously pivoted out of receptacle 14.6. Lastly, a new, unworn earth working tool can be installed on the carrying part in the manner described above.

Working part 22 preferably has, with a deviation of +/−50%, the same width as the carrying part. Low resistance forces during operational use can thereby be achieved. The machine traction power required thereby decreases; only narrow furrows for the introduction of seeds or fertilizer are formed, and the interface between working part 22 and the carrying part experiences less loading.

The invention claimed is:

1. A cultivator bar apparatus for agriculture, comprising:
   a working part, the working part including a cutting element facing in a tool advance direction; and
   a mounting segment adjoining the working part, the mounting segment including a hook-shaped projection including:
      a first support surface;
      an integral spacer segment spacing apart the first and second support surfaces, the integral spacer segment including a lateral surface facing oppositely to the tool advance direction; and
      wherein the first and second support surfaces are set with respect to one another at an angle in the range between >0° and <90°, and the lateral surface is at an obtuse angle to the second support surface, the first and second support surfaces and the lateral surface at least partly defining a hook-in receptacle.

2. The apparatus of claim 1, wherein at least one of the support surfaces is at least partially convex.

3. The apparatus of claim 1, wherein the mounting segment comprises a coupling part including the hook-shaped projection.

4. The apparatus of claim 1, wherein the hook-shaped projection includes a downward extension having a wedge-shaped cross-section in side view.

5. The apparatus of claim 1, wherein the hook-shaped projection and the hook-in receptacle form an interlock segment.

6. The apparatus of claim 1, further comprising a securing receptacle defined in one of the working part and the mounting segment for receiving a securing element.

7. The apparatus of claim 1, wherein the working part is fitted with guide elements made of carbide material.

8. The cultivator bar apparatus of claim 1 in combination with a carrier apparatus for receiving the cultivator bar apparatus, the carrier apparatus comprising:
   a fastening segment; and
   a hook-shaped coupling segment adjoining the fastening segment and including a carrier receptacle open in a tool advance direction for receiving the hook-shaped projection of the cultivator bar apparatus.

9. The combination of claim 8, wherein the carrier apparatus further comprises two lateral parts extending in the tool advance direction and laterally delimiting the carrier receptacle.

10. The combination of claim 8, wherein the coupling segment includes an upward projection defining an internal first coupling support surface within the carrier receptacle and engaging the first support surface of the mounting segment, and the coupling segment includes an external second coupling support surface engaging the second support surface of the mounting segment.

11. The combination of claim 10, wherein:
the upward projection has a front surface facing in the tool advance direction, the front surface being at an obtuse angle to the external second coupling support surface.

12. The combination of claim 10, wherein the internal first coupling support surface and the external second coupling support surface are at an acute angle to each other.

13. The combination of claim 10, wherein the internal first coupling support surface is located above the external second coupling support surface.

* * * * *

UNITED STATES PATENT AND TRADEMARK OFFICE
CERTIFICATE OF CORRECTION

PATENT NO. : 9,820,421 B2  
APPLICATION NO. : 14/419467  
DATED : November 21, 2017  
INVENTOR(S) : Smeets et al.

Page 1 of 1

It is certified that error appears in the above-identified patent and that said Letters Patent is hereby corrected as shown below:

In the Claims

Column 6, Line 23, Claim 1, after "a first support surface;" insert --a second support surface;--

Signed and Sealed this  
Twenty-third Day of January, 2018

Joseph Matal  
*Performing the Functions and Duties of the*  
*Under Secretary of Commerce for Intellectual Property and*  
*Director of the United States Patent and Trademark Office*